(12) United States Patent
Huonker

(10) Patent No.: US 12,066,610 B2
(45) Date of Patent: Aug. 20, 2024

(54) RING FOCUS LENS FOR THE CIRCUMFERENTIAL WELDING OF ROTATIONALLY SYMMETRICAL WORKPIECES

(71) Applicant: TRUMPF Laser GmbH, Schramberg (DE)

(72) Inventor: Martin Huonker, Dietingen (DE)

(73) Assignee: TRUMPF LASER GMBH, Schramberg (DE)

(*) Notice: Subject to any disclaimer, the term of this patent is extended or adjusted under 35 U.S.C. 154(b) by 890 days.

(21) Appl. No.: 17/149,754

(22) Filed: Jan. 15, 2021

(65) Prior Publication Data
US 2021/0141200 A1  May 13, 2021

Related U.S. Application Data

(63) Continuation of application No. PCT/EP2019/057828, filed on Mar. 28, 2019.

(30) Foreign Application Priority Data

Jul. 17, 2018 (DE) ..................... 10 2018 211 874.4

(51) Int. Cl.
*G02B 19/00* (2006.01)
*B23K 26/06* (2014.01)
(Continued)

(52) U.S. Cl.
CPC ...... *G02B 19/0028* (2013.01); *B23K 26/0643* (2013.01); *B23K 26/0734* (2013.01); *B23K 26/282* (2015.10); *B23K 37/053* (2013.01)

(58) Field of Classification Search
CPC .............. G02B 19/0028; B23K 37/053; B23K 26/0734; B23K 26/282; B23K 26/0643
(Continued)

(56) References Cited

U.S. PATENT DOCUMENTS 4,456,811 A * 6/1984 Hella ................. B23K 26/0734
148/903
4,577,938 A * 3/1986 Clegg ..................... F24S 23/30
359/728
(Continued)

FOREIGN PATENT DOCUMENTS

DE    102007035717 A1    7/2008
EP        1609555 A1    12/2005
(Continued)

*Primary Examiner* — Eric S Stapleton
(74) *Attorney, Agent, or Firm* — LEYDIG, VOIT & MAYER, LTD.

(57) ABSTRACT

A ring focus optics for machining rotationally symmetrical or nearly rotationally symmetrical workpieces by an annular laser beam includes a conical mirror configured to deflect the annular laser beam radially inward or outward onto a circumference of at least one workpiece, a rotational axis of which is aligned collinear to an optical axis of the ring focus optics. The ring focus optics further includes a holding/centering device surrounded by the annular laser beam and fastened on the housing of the ring focus optics. The holding/centering device is configured to axially fix the at least one workpiece and/or to radially center the at least one workpiece with respect to the optical axis.

6 Claims, 1 Drawing Sheet

(51) Int. Cl.
*B23K 26/073* (2006.01)
*B23K 26/282* (2014.01)
*B23K 37/053* (2006.01)

(58) Field of Classification Search
USPC .................................................... 219/121.74
See application file for complete search history.

(56) References Cited

U.S. PATENT DOCUMENTS

| | | | | |
|---|---|---|---|---|
| 6,713,713 | B1* | 3/2004 | Caldwell | B29C 65/1635 |
| | | | | 219/121.63 |
| 9,429,716 | B1* | 8/2016 | Elkins, II | G02B 6/3861 |
| 2009/0294417 | A1* | 12/2009 | Spennemann | B23K 26/0652 |
| | | | | 219/121.64 |
| 2015/0316728 | A1* | 11/2015 | Kobyakov | G02B 6/3861 |
| | | | | 156/272.8 |
| 2016/0349461 | A1* | 12/2016 | Kobyakov | G02B 6/3861 |
| 2021/0003432 | A1* | 1/2021 | Otte | B23K 26/0734 |

FOREIGN PATENT DOCUMENTS

| | | |
|---|---|---|
| EP | 2168709 A2 | 3/2010 |
| JP | 2003001474 A | 1/2003 |
| WO | WO 0242196 A2 | 5/2002 |
| WO | WO 2008080731 A1 | 7/2008 |
| WO | WO 2019137893 A1 | 7/2019 |

* cited by examiner

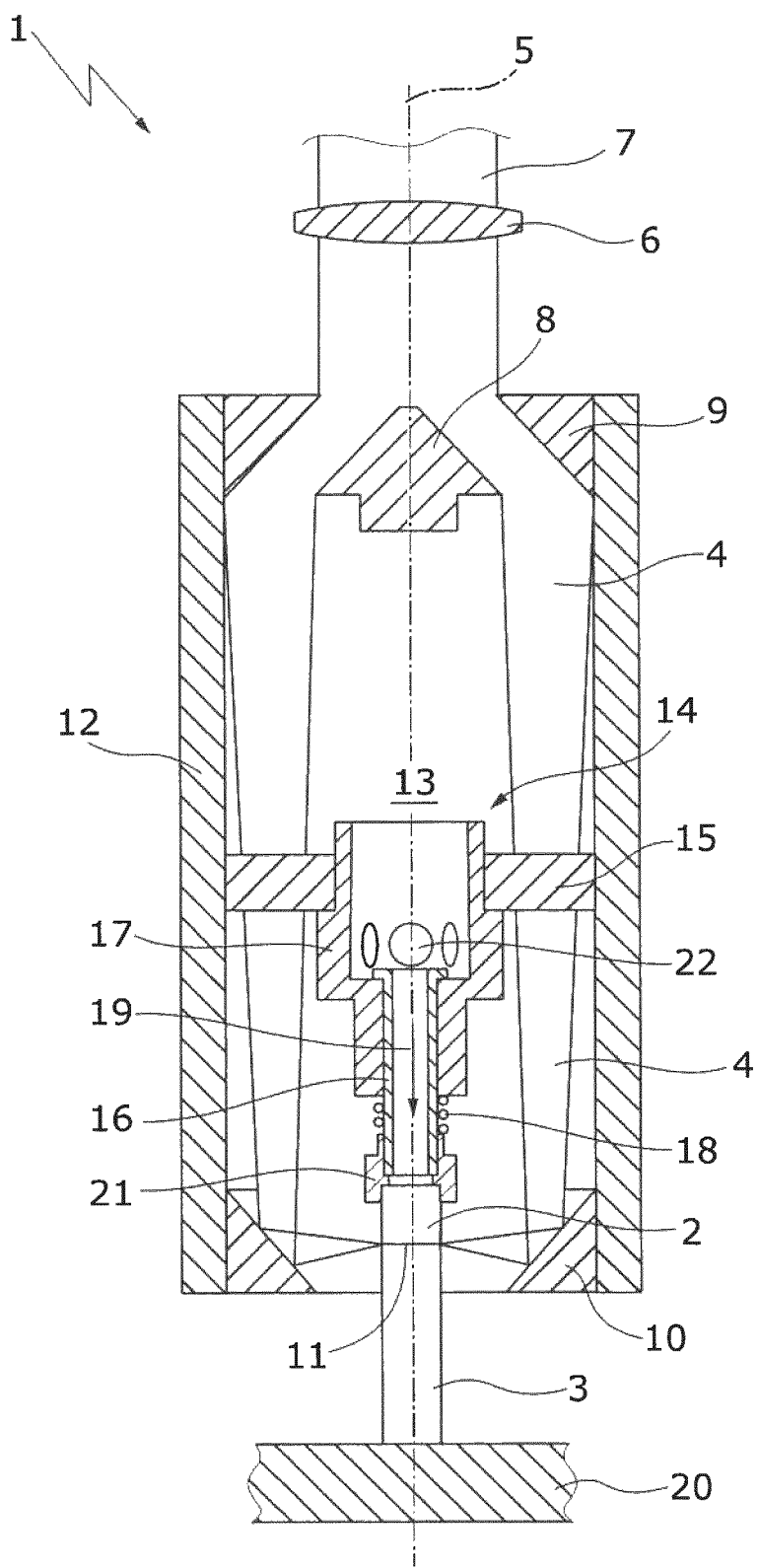

RING FOCUS LENS FOR THE CIRCUMFERENTIAL WELDING OF ROTATIONALLY SYMMETRICAL WORKPIECES

CROSS-REFERENCE TO PRIOR APPLICATIONS

This application is a continuation of International Patent Application No. PCT/EP2019/057828, filed on Mar. 28, 2019, which claims priority to German Patent Application No. DE 10 2018 211 874.4, filed on Jul. 17, 2018. The entire disclosure of both applications is hereby incorporated by reference herein.

FIELD

The invention relates to a ring focus optics for machining, in particular circumferential welding or circumferential hardening, of rotationally symmetrical or nearly rotationally symmetrical workpieces by a laser beam having an annular beam cross section (referred to hereinafter as "annular laser beam") comprising a conical mirror for deflecting the annular laser beam radially inward or outward to the circumference of a workpiece, the rotational axis of which is aligned collinear to the optical axis of the ring focus optics.

BACKGROUND

A ring welding optics is known, for example, from WO 2008/080731 A1. This known ring optics is used for welding workpieces and comprises an axicon, which transforms a circular laser beam into an annular laser beam, and an inner conical mirror having an inner mirror surface, which deflects the annular laser beam radially inward onto a lateral joining zone of the workpieces, in order to create a circumferential weld seam by way of the resulting annular focus geometry. Instead of an inner conical mirror, an outer conical mirror can also be used in order to deflect the annular laser beam radially outward onto a lateral joining zone of the workpieces. The annular laser beam can be focused on the respective circumferential diameter of the joining zone via a focusing optics, which is upstream of the axicon and is displaceable in the direction of the optical axis of the ring welding optics. Two workpieces to be welded abut one another in the axial direction and are adjustable in all spatial directions by means of an adjustment device, which is arranged outside the ring welding optics, for example on a workpiece table downstream of the ring welding optics.

Furthermore, to weld cylindrical workpieces or to create annular weld seams on cylindrical workpieces (welding of round seams), using a rotation optics is also known, in which the laser beam is guided by a pivot joint via a mirror assembly rotating around the workpiece. However, this rotation optics has the disadvantage that a significant mass has to be rotated and that the geometry or the diameter of the created weld seam is not easily changeable. In particular, in applications which require a high machining speed, the high speed required in this case places very high demands on the mechanics and bearing of the rotation optics. Furthermore, there is the problem that holding or centering the workpiece or the assembly to be joined is difficult and complex, if not even impossible, due to the rotation optics rotating around the workpiece.

SUMMARY

In an embodiment, the present invention provides a ring focus optics for machining rotationally symmetrical or nearly rotationally symmetrical workpieces by an annular laser beam. The ring focus optics includes a conical mirror configured to deflect the annular laser beam radially inward or outward onto a circumference of at least one workpiece, a rotational axis of which is aligned collinear to an optical axis of the ring focus optics. The ring focus optics further includes a holding/centering device surrounded by the annular laser beam and fastened on the housing of the ring focus optics. The holding/centering device is configured to axially fix the at least one workpiece and/or to radially center the at least one workpiece with respect to the optical axis.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE schematically illustrates a longitudinal section of a ring focus optics for circumferentially welding two cylindrical workpieces by a pulsed annular laser beam.

DETAILED DESCRIPTION

The present invention provides for refining a ring focus optics in such a way that a workpiece to be machined or the workpieces to be joined can be held or centered in another way.

This present disclosure provides for a holding/centering device, which is surrounded by the annular laser beam, to be fastened on the housing of the ring focus optics and for radially centering and/or axially fixing the at least one workpiece with respect to the optical axis.

According to the present disclosure, the holding/centering device can be integrated into the ring focus optics and arranged in the interior of the ring focus optics, which is delimited radially outward by the annular laser beam.

In one particularly preferred embodiment, the holding/centering device comprises a carrier plate (for example made of quartz glass), which is arranged in the beam path of the annular laser beam, is transmissive to the laser beam and is fastened outside the annular laser beam on the housing of the ring focus optics, and also a holding/centering element fastened on the carrier plate for centering and/or fixing the at least one workpiece. The holding/centering element is preferably designed as a centering stamp, which is axially displaceably guided on the carrier plate and is pre-tensioned (for example spring-loaded) towards the at least one workpiece, in order to automatically press the workpiece against a workpiece table during the machining.

In one advantageous refinement of this embodiment, the carrier plate or a guide sleeve fastened thereon has at least one, in particular multiple, through holes for a gas (for example clean, dust-free air or also a protective gas), which, viewed in the direction of the beam path of the annular laser beam, is introduced in front of the carrier plate into the ring focus optics and is guided out of the ring focus optics after the carrier plate, for example through an opening of the conical mirror, again out of the ring focus optics. With the aid of this air flushing, the optical elements arranged in the beam path of the annular laser beam can be kept clean by blowing away the smoke possibly arising during the laser machining.

The conical mirror preferably deflects the annular laser beam perpendicularly or obliquely to the optical axis onto the at least one workpiece. In the latter case, if the ring focus, viewed in the direction of the beam path of the annular laser beam, is downstream of the conical mirror, the ring focus is outside the ring focus optics, and spatter, smoke, or vapors arising during the machining can be kept away from the ring focus optics better. This beam course also permits the ring focus optics to be used for example for hardening the inner surface of less deep holes.

The location of the conical mirror is adjustable here in the direction of the optical axis, so that the diameter of the generated laser beam focus ring can be set by axially displacing the conical mirror.

Preferably, at least one optical element is upstream of the conical mirror, which element transforms an incident laser beam having circular beam cross section (referred to as "circular laser beam" hereinafter) into the annular laser beam. This optical element can be, for example, a diffractive element, for example an axicon, or a combination of an outer conical mirror and an inner conical mirror.

Furthermore, a focusing optics is preferably upstream of the conical mirror, which focusing optics focuses the annular laser beam on the at least one workpiece. This focusing optics can be arranged, for example, even before the optical element which converts the circular laser beam into the annular laser beam, or else between this optical element and the conical mirror.

Further advantages and advantageous designs of the subject matter of the invention result from the description, the claims, and the drawing. The above-mentioned features and the features set forth in the following can also be used as such or in multiples in any combinations. The embodiments shown and described are not to be understood as an exhaustive list, but rather have exemplary character for the description of the invention.

The sole FIGURE schematically shows a longitudinal section of a ring focus optics 1 for circumferentially welding two cylindrical workpieces 2, 3 by means of a pulsed annular laser beam 4. The axis of rotation of the two workpieces 2, 3 is aligned collinear to the optical axis 5 of the ring focus optics 1.

The ring focus optics 1 comprises a focusing optics 6, which focuses an incident circular laser beam 7, an inner conical mirror 8 having a conical outer mirror surface and an outer conical mirror 9 having an annular inner mirror surface, which transform the circular laser beam 7 into the annular laser beam 4, and a conical mirror 10 having an annular inner mirror surface which deflects the annular laser beam 4 radially inward onto the jacket-side joining zone 11 of the two workpieces 2, 3, in order to create a circumferential weld seam there by way of the resulting annular focus geometry. A uniform, symmetrical circumferential weld seam results by means of the annular laser beam 4 or laser beam focus ring acting simultaneously on the entire joining zone 11.

The diameter of the generated laser beam focus ring can be varied by displacing the conical mirror 10 along the optical axis 5. The annular laser beam 4 extends in a housing 12, on which the focusing optics 6 and the three conical mirrors 8-10 are fastened.

Instead of the two conical mirrors 8, 9, an axicon having a conical target surface and a planar emission surface arranged transversely to the beam path can also be arranged in the beam path of the incident circular laser beam 7, in order to transform the circular laser beam 7 into the annular laser beam 4.

The ring focus optics 1 furthermore comprises, in the interior 13 enclosed by the annular laser beam 4 between the two conical mirrors 8, 9 on one side and the conical mirror 10, a holding/centering device 14 for axially fixing the workpieces 2, 3 and for radially centering the workpieces 2, 3 with respect to the optical axis 5. The holding/centering device 14 positioned on the optical axis 5 comprises a carrier plate 15, which is arranged in the beam path of the annular laser beam 4, is transmissive for the laser beam and is fastened outside the annular laser beam 4 on the housing 12 of the ring focus optics 1, and also a centering stamp 16 guided axially displaceably on the carrier plate 15 for centering and fixing the workpieces 2, 3. For this purpose, a guide sleeve 17 is fixed in a central hole of the carrier plate 15, in which guide sleeve the centering stamp 16 is pretensioned against the action of a compression spring 18 in the arrow direction 19 towards the workpieces 2, 3, in order to automatically press the workpieces 2, 3 during the machining against a workpiece table 20 and thus also against one another. The centering stamp 16 bears a centering receptacle 21 on its end facing the workpiece, in which centering receptacle the upper workpiece 2 is accommodated and thus centered with respect to the optical axis 5.

The carrier plate 15 or else, as shown in FIG. 1, the guide sleeve 17 has a number of through holes 22, through which clean, dust-free air (possibly also protective gas), which is introduced in the vicinity of the focusing optics 6 into the ring focus optics 1, is guided up into the region of the ring focus optics 1 close to the workpiece and is guided back out of the ring focus optics 1 via a central opening of the conical mirror 10. By means of this air flushing, the conical mirrors 8-10 can be kept clean by blowing away the smoke possibly arising during the laser machining.

A modified embodiment provides forming the conical mirror 10 so that the laser beam focus ring comes to rest below the conical mirror 10 and thus outside or, in FIG. 1 below, the ring focus optics 1. This arrangement has the advantage that spatter, smoke, or vapors arising during the laser machining can be kept away better from the ring focus optics 1.

Instead of the annular inner mirror surface, a conical mirror (not shown) having an annular outer mirror surface can be used, in order to not deflect the annular laser beam 4 radially inward as shown in FIG. 1, but radially outward. This beam course permits the ring focus optics 1 to be used for example for hardening the inner surface of less deep holes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A ring focus optics for machining rotationally symmetrical or nearly rotationally symmetrical workpieces by an annular laser beam, the ring focus optics comprising:
- a conical mirror configured to deflect the annular laser beam radially inward onto a circumference of at least one workpiece, wherein a rotational axis of the conical mirror is aligned collinear to an optical axis of the ring focus optics,
- a holding/centering device surrounded by the annular laser beam and fastened on a housing of the ring focus optics, the holding/centering device configured to axially fix the at least one workpiece and/or for radially centering the at least one workpiece with respect to the optical axis,
wherein the holding/centering device comprises:
- a carrier plate arranged in a beam path of the annular laser beam, the carrier plate being transmissive to the laser beam and being fastened outside the annular laser beam on the housing of the ring focus optics,
- a holding/centering element fastened on the carrier plate for centering and/or fixing the at least one workpiece, and
- a guide sleeve fixed in a central bore of the carrier plate, wherein the holding/centering element is guided in the guide sleeve in an axially displaceable manner; and
wherein the guide sleeve has at least one circumferential through hole, so as to allow a gas introduced into an interior of the ring focus optics in front of the carrier plate and into the guide sleeve in an axial direction to exit the guide sleeve through the at least one circumferential through hole.

2. The ring focus optics as claimed in claim 1, wherein the holding/centering element is designed as a centering stamp that is guided axially displaceably on the carrier plate and is pre-tensioned in a direction towards the at least one workpiece.

3. The ring focus optics as claimed in claim 1, wherein the conical mirror deflects the annular laser beam perpendicularly or obliquely to the optical axis onto the at least one workpiece.

4. The ring focus optics as claimed in claim 1, wherein the conical mirror is adjustable in a direction of the optical axis.

5. The ring focus optics as claimed in claim 1, further comprising at least one optical element upstream of the conical mirror configured to transform an incident circular laser beam into the annular laser beam.

6. The ring focus optics as claimed in claim 1, further comprising a focusing optics upstream of the conical mirror, the focusing optics configured to focus the annular laser beam on the at least one workpiece.

\* \* \* \* \*